US011386788B2

(12) United States Patent
Tang et al.

(10) Patent No.: US 11,386,788 B2
(45) Date of Patent: Jul. 12, 2022

(54) METHOD AND APPARATUS FOR CONTROLLING INTERACTION BETWEEN VEHICLE AND VEHICLE-MOUNTED DEVICE

(71) Applicant: Baidu Online Network Technology (Beijing) Co., Ltd., Beijing (CN)

(72) Inventors: Mengmeng Tang, Beijing (CN); Wanqi Chai, Beijing (CN); Junping Wang, Beijing (CN); Fan Yang, Beijing (CN); Chen Chen, Beijing (CN); Wenlong Rao, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 264 days.

(21) Appl. No.: 16/662,869

(22) Filed: Oct. 24, 2019

(65) Prior Publication Data
US 2020/0152068 A1    May 14, 2020

(30) Foreign Application Priority Data
Nov. 9, 2018    (CN) .......................... 201811334484.8

(51) Int. Cl.
*G08G 1/00* (2006.01)
*G01C 21/36* (2006.01)
(Continued)

(52) U.S. Cl.
CPC ........... *G08G 1/20* (2013.01); *G01C 21/3629* (2013.01); *G01C 21/3661* (2013.01);
(Continued)

(58) Field of Classification Search
CPC ........... G08G 1/20; G07F 9/002; G07F 9/001; G07F 5/26; G01C 21/3661;
(Continued)

(56) References Cited

U.S. PATENT DOCUMENTS 6,581,024 B1 * 6/2003 Shimizu .................. G07F 19/20
702/183
2010/0138037 A1 * 6/2010 Adelberg ................ G07F 9/001
700/241
(Continued)

FOREIGN PATENT DOCUMENTS

CN    107985165 A  *  5/2018
CN    107985165 A     5/2018
(Continued)

*Primary Examiner* — Fadey S. Jabr
*Assistant Examiner* — Mohamed Abdo Algehaim
(74) *Attorney, Agent, or Firm* — Nixon Peabody LLP

(57) ABSTRACT

A method and an apparatus for controlling interaction between a vehicle and a vehicle-mounted device are provided according to embodiments of the disclosure. The method includes: determining whether the vehicle is in a parking state; acquiring input operation information of a user, in response to determining the vehicle being in the parking state; determining whether there is as operation matching the input operation information based on the input operation information; and sending control information for executing the operation to the vehicle-mounted device, in response to determining there being the operation matching the input operation information. The embodiment achieves controlling the vehicle-mounted device based on the vehicle state and the user input.

15 Claims, 6 Drawing Sheets

(51) Int. Cl.
*G05D 1/02* (2020.01)
*G07C 5/08* (2006.01)
*G10L 15/22* (2006.01)
*G07F 9/00* (2006.01)

(52) U.S. Cl.
CPC ....... *G01C 21/3697* (2013.01); *G05D 1/0214* (2013.01); *G07C 5/0816* (2013.01); *G07F 9/001* (2020.05); *G07F 9/002* (2020.05); *G10L 15/22* (2013.01); *G10L 2015/227* (2013.01)

(58) Field of Classification Search
CPC .............. G01C 21/3697; G05D 1/0214; G07C 5/0816; G10L 15/22; G10L 2015/227; G06Q 10/083; G06Q 50/28; H04L 67/12; B60W 50/00; B60W 50/08; B60W 2050/0005; B60W 60/00–60/007
USPC ........................................................ 701/117
See application file for complete search history.

(56) References Cited

U.S. PATENT DOCUMENTS

| | | | | |
|---|---|---|---|---|
| 2010/0214413 A1* | 8/2010 | Lin | ........................ | G07G 3/003 348/150 |
| 2011/0082616 A1* | 4/2011 | Small | ................. | G01C 21/3664 715/744 |
| 2012/0136478 A1* | 5/2012 | Anand | .................... | G07F 9/001 709/201 |
| 2014/0236728 A1* | 8/2014 | Wright | ............... | G06Q 30/0261 705/14.66 |
| 2015/0045947 A1* | 2/2015 | Yau | ........................... | G07F 7/06 700/237 |
| 2016/0041811 A1* | 2/2016 | Parundekar | .............. | G06F 3/167 704/275 |
| 2016/0236778 A1* | 8/2016 | Takayama | ................ | B64C 39/02 |
| 2017/0240098 A1 | 8/2017 | Sweeney et al. | | |
| 2018/0053369 A1* | 2/2018 | High | ..................... | G07F 11/004 |
| 2018/0099602 A1 | 4/2018 | Salter et al. | | |
| 2018/0224844 A1 | 8/2018 | Zhang et al. | | |
| 2019/0026688 A1* | 1/2019 | Liu | ....................... | G06Q 10/087 |
| 2019/0034857 A1* | 1/2019 | Ferguson | ................... | A23L 2/52 |
| 2019/0035044 A1* | 1/2019 | Ferguson | ........... | G06Q 10/0635 |
| 2019/0108709 A1* | 4/2019 | Yamazaki | ............. | G07F 13/065 |
| 2019/0228375 A1* | 7/2019 | Laury | ................... | G01C 21/343 |
| 2019/0259232 A1* | 8/2019 | Nandakumar | ...... | G06Q 10/0836 |
| 2020/0005778 A1* | 1/2020 | Kim | ........................ | G10L 15/30 |
| 2020/0050978 A1* | 2/2020 | Perez Barrera | ......... | G06Q 50/30 |
| 2020/0082333 A1* | 3/2020 | Zhu | ........................ | G06F 21/602 |
| 2020/0105084 A1* | 4/2020 | Li | ....................... | G06Q 30/0641 |
| 2020/0105085 A1* | 4/2020 | Jafa | ........................ | G06Q 20/202 |
| 2020/0211313 A1* | 7/2020 | Chen | ........................ | G07F 11/42 |
| 2020/0371523 A1* | 11/2020 | Katayama | ............ | G05D 1/0214 |
| 2021/0134103 A1* | 5/2021 | Yamato | .................... | G07F 17/12 |
| 2021/0304559 A1* | 9/2021 | Cupersmith | ........... | G06V 20/10 |
| 2021/0311539 A1* | 10/2021 | Goto | ...................... | G06F 1/3234 |

FOREIGN PATENT DOCUMENTS

| | | |
|---|---|---|
| CN | 1079851656 A | 5/2018 |
| GB | 2551909 A | 1/2018 |

* cited by examiner

METHOD AND APPARATUS FOR CONTROLLING INTERACTION BETWEEN VEHICLE AND VEHICLE-MOUNTED DEVICE

CROSS-REFERENCE TO RELATED APPLICATIONS

This application claims priority to Chinese Patent Application No. 201811334484.8, filed on Nov. 9, 2018, titled "Method and Apparatus for Controlling Interaction Between Vehicle and Vehicle-mounted Device," which is hereby incorporated by reference in its entirety.

TECHNICAL FIELD

Embodiments of the present disclosure relate to the field of vehicle control technology, and in particular to, a method and apparatus for controlling interaction between a vehicle and a vehicle-mounted device.

BACKGROUND

With the rapid development of computer and Internet technology, vehicle control technology is increasingly improved. In practice, a vehicle generally carries a smart vehicle-mounted device, to play a corresponding function.

SUMMARY

Embodiments of the present disclosure present a method and apparatus for controlling interaction between a vehicle and a vehicle-mounted device.

In a first aspect, an embodiment of the present disclosure provides a method for controlling interaction between a vehicle and a vehicle-mounted device, including: determining whether the vehicle is in a parking state; acquiring input operation information of a user, in response to determining the vehicle being in the parking state; determining whether there is an operation matching the input operation information based on the input operation information; and sending control information for executing the operation to the vehicle-mounted device, in response to determining there being the operation matching the input operation information.

In some embodiments, the input operation information includes an audio; and the determining whether there is an operation matching the input operation information includes: performing a voice recognition on the audio, to generate a voice recognition result; and determining whether there is the operation matching the input operation information based on the voice recognition result.

In some embodiments, the method further includes: sending a prompt message in response to determining there not being the operation matching the input operation information.

In some embodiments, the method further includes: determining whether there is a traffic participant in an area within a preset distance from the vehicle, in response to determining that no input operation information of the user is received within a preset time interval; and sending control information for controlling the vehicle to start to move, in response to determining there not being the traffic participant in the area within the preset distance from the vehicle.

In some embodiments, the sending control information for controlling the vehicle to start to move includes: acquiring state information of the vehicle-mounted device; determining whether there is a failure the vehicle-mounted device based on the state information; and sending the control information for controlling the vehicle to start to move, in response to determining there not being the failure in the vehicle-mounted device.

In some embodiments, the method further includes: sending an interactive prompt message for guiding the traffic participant to perform an interactive operation, in response to determining the vehicle being in a traveling state.

In some embodiments, the method further includes: sending a safety prompt message, in response to determining the vehicle being in a turning and traveling state.

In a second aspect, an embodiment of the present disclosure provides an apparatus controlling interaction between a vehicle and a vehicle-mounted device, including: a first determining unit configured to determine whether the vehicle is in a parking state; an acquiring unit configured to acquire input operation information of a user in response to determining the vehicle being in the parking state; a second determining unit configured to determine whether there is an operation matching the input operation information based on the input operation information; and a first sending unit configured to send control information for executing the operation to the vehicle-mounted device, in response to determining there being the operation matching the input operation information.

In some embodiments, the input operation information includes an audio; and the second determining unit includes: a voice recognizing module configured to performing a voice recognition on the audio, to generate a voice recognition result; and a first determining module configured to determine whether there is the operation matching the input operation information based on the voice recognition result.

In some embodiments, the apparatus further includes: a second sending unit configured to send a prompt message in response to determining there not being the operation matching the input operation information.

In some embodiments, the apparatus further includes: a third determining unit configured to determine whether there is a traffic participant in an area within a preset distance from the vehicle, in response to determining that no input operation information of the user is received within a preset time interval; and a third sending unit configured to send control information for controlling the vehicle to start to move, in response to determining there not being the traffic participant in the area within the preset distance from the vehicle.

In some embodiments, the third sending unit includes: an acquiring module configured to acquire state information of the vehicle-mounted device; a second determining module configured to determine whether there is a failure in the vehicle-mounted device based on the state information; and a sending module configured to send the control information for controlling the vehicle to start to move, in response to determining there not being the failure in the vehicle-mounted device.

In some embodiments, the apparatus further includes: a fourth sending unit configured to send an interactive prompt message for guiding the traffic participant to perform an interactive operation, in response to determining the vehicle being in a traveling state.

In some embodiments, the apparatus further includes: a fifth sending unit configured to send a safety prompt message, in response to determining the vehicle being in a turning and traveling state.

In a third aspect, an embodiment of the present disclosure provides an electronic device, including: one or more processors; and a storage apparatus, storing one or more programs, where the one or more programs, when executed by the one or more processors, cause the one or more processors to implement the method according to any one implementation in the first aspect.

In a fourth aspect, an embodiment of the present disclosure provides a vehicle, including an electronic device as described in the third aspect.

In a fifth aspect, an embodiment of the present disclosure provides a computer readable medium, storing a computer program thereon, where the program, when executed by a processor, implements the method according to any one implementation in the first aspect.

According to the method and apparatus for controlling interaction between a vehicle and a vehicle-mounted device provided by the embodiments of the present disclosure, first whether the vehicle is in a parking state is determined; then input operation information of a user is acquired, in response to determining the vehicle being in the parking state; then whether there is an operation matching the input operation information is determined based on the input operation information; and finally control information for executing the operation is sent to the vehicle-mounted device, in response to determining there being the operation matching the input operation information, thereby achieving controlling the vehicle-mounted device based on the vehicle state and the user input.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be understood that the specific embodiments described herein are merely used for explaining the relevant disclosure, rather than limiting the disclosure. In addition, it should be further noted that, for the ease of description, only the parts related to the relevant disclosure are shown in the accompanying drawings.

It should be rioted that the embodiments in the present disclosure and the features in the embodiments may be combined with each other on a non-conflict basis. The present disclosure will be described below in detail with reference to the accompanying drawings and in combination with the embodiments.

Figure 1:
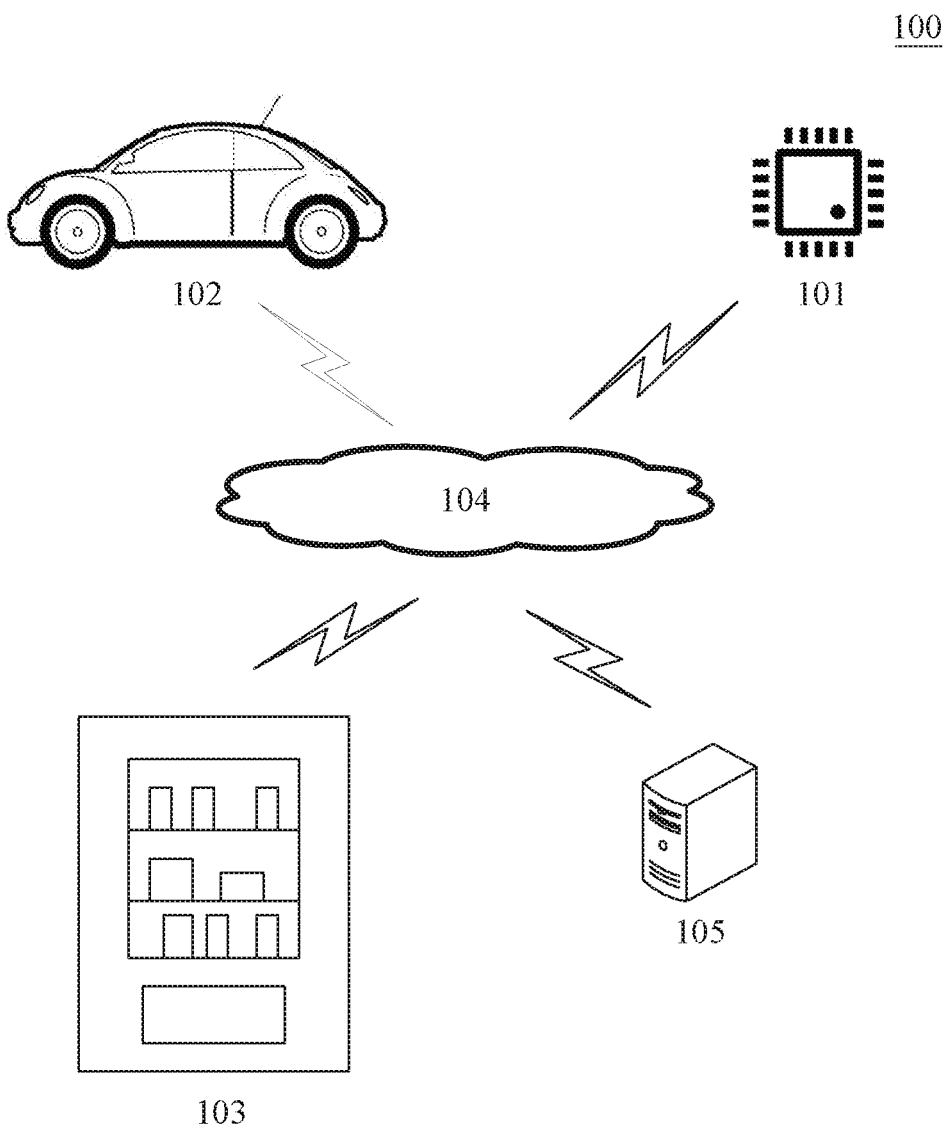
FIG. 1 is an architectural diagram of an exemplary system in which an embodiment of the present disclosure may be implemented.

FIG. 1 shows an exemplary architecture 100 in which a method for controlling interaction between a vehicle and a vehicle-mounted device or an apparatus for controlling interaction between a vehicle and a vehicle-mounted device of the present disclosure may be implemented.

As shown in FIG. 1, the system architecture 100 may include a control device 101, a driving control system 102, a vehicle-mounted device 103, a network 104, and a server 105. The network 104 serves as a medium providing a communication link between the control device 101, the driving control system 102, the vehicle-mounted device 103, and the server 105. The network 104 may include various types of connections, such as wired or wireless communication links, or optical fibers.

Interaction between the control device 101, the driving control system 102, the vehicle-mounted device 103, and the server 105 may be implemented via the network 104, to receive or send a message. The control device 101, the driving control system 102, and the vehicle-mounted device 103 may be provided with various communication client applications, such as a shopping application, an instant messaging tool, and an email client.

The control device 101, the driving control system 102, and the vehicle-mounted device 103 may be hardware or software. When the driving control system 102 is hardware, the driving control system may be a vehicle capable of implementing autonomous driving. When the vehicle-mounted device 103 is hardware, the vehicle-mounted device may be various electronic devices having a display screen and supporting human-machine interaction, including but not limited to vending machine, a self-service parcel delivery locker, and the like. When the control device 101 is hardware, the control device may be a processor having a computing power. The processor, can control the interaction between the driving control system 102 and the vehicle-mounted device 103. It should be noted that, the control device 101 may be integrated into the driving control system 102, or independent from the driving control system 102.

When the control device 101, the driving control system 102, and the vehicle-mounted device 103 are software, the control device, the driving control system, and the vehicle-mounted device may be installed in the above-listed processor, vehicle and electronic device, respectively, or be implemented as a plurality of software programs or software modules (e.g., software programs or software modules for providing distributed services), or as a single software program or software module. This is not specifically limited here.

The server 105 may be a server providing various services, such as a back-end server providing support for implementing autonomous driving on the driving control system 102. The control device 101 may send information of the interaction between the driving control system 102 and the vehicle-mounted device 103 to the back-end server. The back-end server may analyze and process the above information, and generate a processing result. Further, the back-end server may further return the generated processing result to the control device 101, the driving control system 102, and the vehicle-mounted device 103.

It should be noted that the server may be hardware or software. When the server is hardware, the server may be implemented as a distributed server cluster composed of a plurality of servers, or may be implemented as a single server. When the server is software, the server may be implemented as a plurality of software programs or software modules (e.g., software programs or software modules for providing distributed services), or may be implemented as a single software program or software module. This is not specifically limited here.

It should be noted that the method for controlling interaction between a vehicle and a vehicle-mounted device provided by the embodiment of the present disclosure is generally executed by the control device 101. Accordingly, the apparatus for controlling interaction between a vehicle and a vehicle-mounted device is generally provided in the control device 101.

It should be further noted that, when the method is executed by the control device 101, the server may not be used. In this case, the network may alternatively be implemented in a form of a bus.

It should be understood that the numbers of control devices, driving control systems, vehicle-mounted devices, networks, and servers in FIG. 1 are merely illustrative. Any number of control devices, driving control systems, vehicle-mounted devices, networks, and servers may be provided based on actual requirements.

Figure 2:
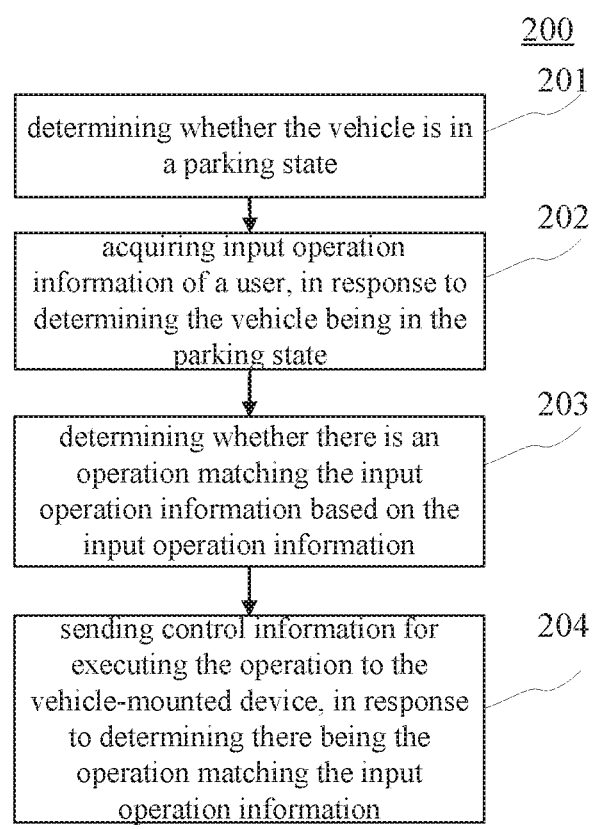
FIG. 2 is a flowchart of an embodiment of a method for controlling interaction between a vehicle and a vehicle-mounted device according to the present disclosure.

Further referring to FIG. 2, a process 200 of an embodiment of a method for controlling interaction between a vehicle and a vehicle-mounted device according to the present disclosure is shown. The method for controlling interaction between a vehicle and a vehicle-mounted device includes the following steps 201 to 204.

Step 201: determining whether the vehicle is in a parking state.

In the present embodiment, an executing body (e.g., the control device 101 shown in FIG. 1) of the method for controlling interaction between a vehicle and a vehicle-mounted device may determine whether the vehicle is in the parking state by various approaches. The vehicle may be various vehicles. For example, the vehicle may be a smart vehicle, such as an autonomous vehicle or an unmanned vehicle, etc. Alternatively, the vehicle may be a conventional manual vehicle. In practice, the executing body can determine whether the vehicle is in the parking state based on a speed measured by a speed sensor mounted on the vehicle, or determine whether the vehicle is in the parking state based on information characterizing traveling state of the vehicle. The above information characterizing the traveling state of the vehicle may be in various forms. For example, "00" may be used to denote a parking state; "01" may be used to denote a forward traveling state of the vehicle; "10" may be used to denote a backward traveling state of the vehicle; and "11" may be used to denote a turning and traveling state.

Step 202: acquiring input operation information of a user, in response to determining the vehicle being in the parking state.

In the present embodiment, the executing body may acquire the input operation information of the user by various approaches, in response to determining the vehicle being in the parking state. The user may be various users, for example, a user taking the vehicle or a user outside the vehicle. The input operation information may be information for characterizing an interaction operation between the user and the vehicle or the vehicle-mounted device. As an example, the input operation information may be a verification code inputted by the user on a touch screen mounted on the vehicle-mounted device or the vehicle. In these cases, the executing body may acquire the verification code inputted by the user from the vehicle-mounted device through a wired connection or a wireless connection. The vehicle-mounted device may be a device for controlling the traveling state of the vehicle, such as an accelerator pedal, or a transmission. The vehicle-mounted device may further be other devices mounted on the vehicle, such as a vending machine, and a self-service parcel delivery locker.

In some alternative implementations of the present embodiment, the input operation information may include an audio. As an example, the input operation information may be an audio formed by processing a voice "buy a bottle of drink" inputted by the user via a voice input device (e.g. a microphone) mounted on the vehicle-mounted device or the vehicle. In these implementations, the executing body can b acquire the audio converted from the voice inputted by the user from the voice input device through the wired connection or the wireless connection.

Step 203: determining whether there is an operation matching the input operation information based on the input operation information.

In the present embodiment, the executing body can determine whether there is the operation matching the input operation information acquired in step 201 based on the input operation information. The operation matching the input operation information may be an operation that can be completed by the vehicle-mounted device.

As an example, the vehicle-mounted device may be the self-service parcel delivery locker; and the input operation information may be the verification code inputted by the user on the touch screen and received by the vehicle-mounted device. Then, the operation matching the input operation information may be opening a cabinet door of the self-service parcel delivery locker based on the verification code. The executing body can compare the above verification code with a verification code for opening the cabinet door in a preset verification code set for opening cabinet doors. In response to determining the preset verification code set for opening the cabinet doors including the verification code for opening the cabinet door identical to the above inputted verification code, there being the operation matching the input operation information is determined. In response to determining, the preset verification code set for opening the cabinet doors excluding the verification code for opening the cabinet door identical to the above inputted verification code, there not being the operation matching the input operation information is determined.

As another example, the vehicle-mounted device may alternatively be the vending machine; and the input operation information may include a selected purchasing item and a paid amount inputted by the user on the touch screen and received by the vehicle-mounted device. Then, the operation matching the input operation information may include sending the item to a dispensing port based on an inventory level and the paid amount. The executing body may compare the above item with the inventory level corresponding to the above item, and compare the paid amount with a price of the item. In response to determining a number of purchasing items being smaller than or equal to the inventory level, and determining the paid amount being greater than or equal to the price of the items, there being the operation matching the input operation information is determined. In response to determining the number of purchasing items being greater than the inventory level, or determining the paid amount being smaller than the price of the items, there not being the operation matching the input operation information is determined.

In some alternative implementations of the present embodiment, the executing body can determine whether there is the operation matching the input operation information through the following steps.

Step I: performing voice recognition on the audio, to generate a voice recognition result.

In these implementations, the input operation information may include the audio. The executing body can perform a voice recognition on the audio, to generate the voice recognition result. In practice, the voice recognition method is mainly a pattern matching method. Specifically, first, the audio may be pre-processed by, e.g., endpoint detection, noise reduction, and feature extraction; then, the processed audio is encoded; and then, the encoded feature is inputted into a pre-trained voice recognition model, to obtain a recognized text. The above feature may include, but is not limited to, at least one of the following items: a linear predictive coding (LPC), and a Mel-scale Frequency Cepstral Coefficient (MFCC). The above voice recognition model may be a Deep Neural Network (DNN)-Hidden Markov Model (HMM) model. It should be noted that the above voice recognition method is a well-known technology that is widely researched and applied at present. The description will not be repeated here.

Step II: determining whether there is the operation matching the input operation information based on the voice recognition result.

In these implementations, the operation matching the input operation information may be an operation that can be completed by the vehicle-mounted device. As an example, the vehicle-mounted device may be the self-service parcel delivery locker; and the input operation information may be the verification code inputted by the user. Then, the operation matching the input operation information may be opening the cabinet door of the self-service parcel delivery locker based on the voice recognition result. The executing body may compare the voice recognition result with the preset verification code set for opening the cabinet doors. In response to determining that the preset verification code set for opening the cabinet doors includes the verification code for opening the cabinet door identical to the above voice recognition result, there being the operation matching the input operation information is determined. In response to determining that the preset verification code set for opening the cabinet doors does not include the verification code for opening the cabinet door identical to the above voice recognition result, there not being the operation matching the input operation information is determined.

In some alternative implementations of the present embodiment, the executing body may further send a prompt message, in response to determining there not being the operation matching the input operation information. The prompt message may be information characterizing that the input operation information can not be responded. The prompt message may further be information in various forms for prompting to make a modification to the input operation information. For example, in the above examples, the executing body, in response to determining there not being the operation matching the input operation information, can send "verification failure, please re-input the verification code" for use as the prompt message; or send "insufficient number of items. Please select other items" for use as the prompt message. It should be noted that, the prompt message may take various forms, such as characters, letters, and numerals. The prompt message may alternatively be displayed in combination with an image, a voice, a video, and the like.

Step 204: sending control information for executing the operation to the vehicle-mounted device, in response to determining there being the operation matching the input operation information.

In the present embodiment, the executing body may send control information for executing the operation to the vehicle-mounted device, in response to determining there being the operation matching the input operation information. The control information may take various character forms, such as numerals, and letters. It can be understood that different control operations correspond to different kinds of control information.

As an example, the executing body can send control information "0010" characterizing opening a cabinet door No. 2 to the self-service parcel delivery locker, which is the vehicle-mounted device. As another example, the executing body may send control information "0001, 0001" characterizing selling an item No. 1 and giving change of one CNY to the self-service parcel delivery locker being the vehicle-mounted device.

Figure 3:
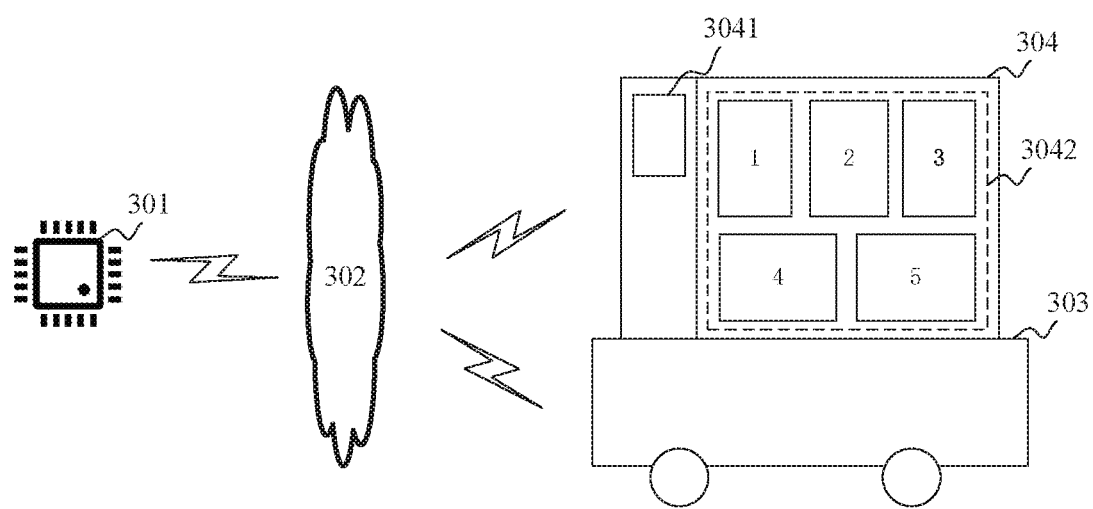
FIG. 3 is a schematic diagram of an application scenario of the method for controlling interaction between a vehicle and a vehicle-mounted device according to an embodiment of the present disclosure.

Further referring to FIG. 3, FIG. 3 is a schematic diagram of an application scenario of the method for controlling interaction between a vehicle and a vehicle-mounted device according to an embodiment of the present disclosure. In the application scenario of FIG. 3, a control device 301 first communicates with the vehicle 303 via a network 302, and determines whether the vehicle 303 is in a parking state based on a speed measured by a speed sensor (not shown in FIG. 3) mounted on the vehicle 303. Then, a user (not shown in FIG. 3) inputs a verification code "123456" via a touch screen 3041 on the vehicle-mounted device 304. The control device 301 acquires "123456" inputted by the user for use as input operation information, in response to determining the vehicle 303 being in the parking state. Then, the control device 301 determines an operation matching the verification code "123456" being opening a cabinet door No. 2 of a courier cabinet based on the verification code "123456" inputted by the user. Finally, in response to determining there being the operation matching "123456," the control device 301 sends control information for opening the cabinet door No. 2 of the courier cabinet 3042 to the vehicle-mounted device 304.

The method provided by the above embodiments of the present disclosure first determines whether the vehicle is in a parking state; then acquires input operation information of a user, in response to determining the vehicle being in the parking state; then determines whether there is an operation matching the input operation information based on the input operation information; and finally sends control information for executing the operation to the vehicle-mounted device, in response to determining there being the operation matching the input operation information, thereby achieving controlling the vehicle-mounted device based on the vehicle state and the user input.

Figure 4:
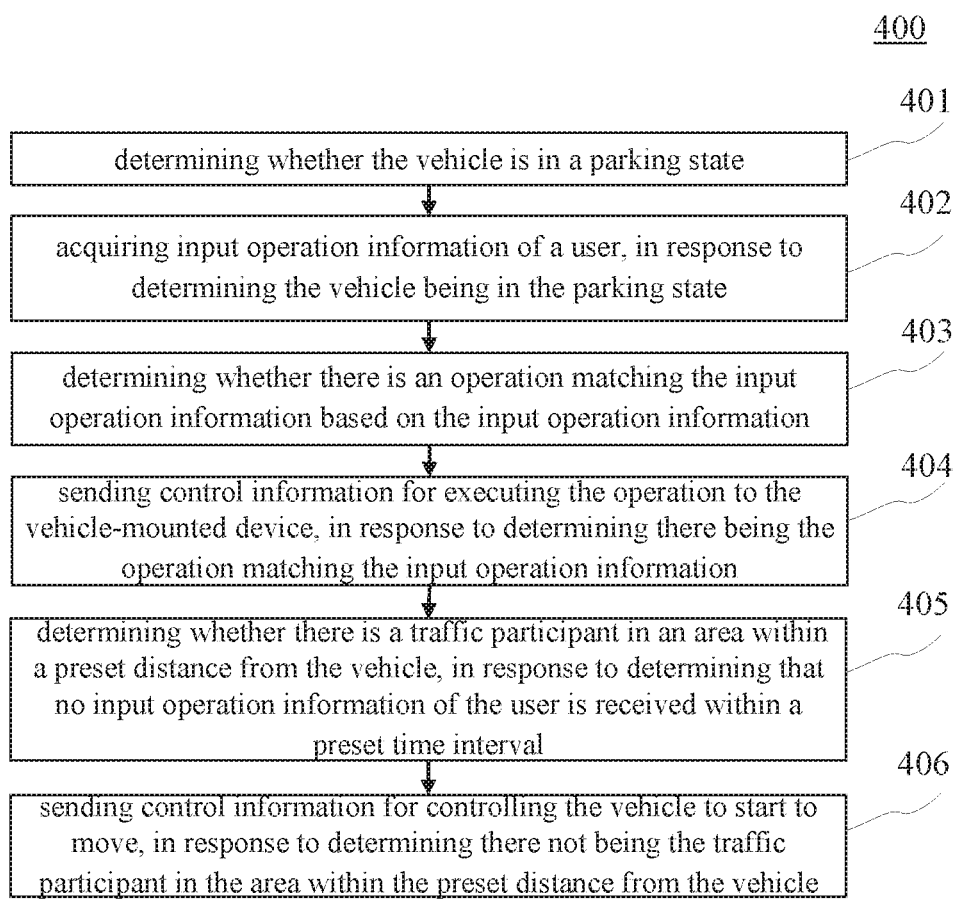
FIG. 4 is a flowchart of another embodiment of the method for controlling interaction between a vehicle and a vehicle-mounted device according to the present disclosure.

Further referring to FIG. 4, a process 400 of another embodiment of the method for controlling interaction between a vehicle and a vehicle-mounted device is shown. The process 400 of the method for controlling interaction between a vehicle and a vehicle-mounted device includes the following steps 401 to 406.

Step 401: determining whether the vehicle is in a parking state.

Step 402: acquiring input operation information of a user, in response to determining the vehicle being in the parking state.

Step 403: determining whether there is an operation matching the input operation information based on the input operation information.

Step 404: sending control information for executing the operation to the vehicle-mounted device, in response to determining there being the operation matching the input operation information.

The above step 401, step 402, step 403, and step 404 are consistent with step 201, step 202, step 203, and step 204 in the above-mentioned embodiments. The above description on step 201, step 202, step 203, and step 204 also apply to step 401, step 402, step 403, and step 404. The description is not repeated here.

Step 405: determining whether there is a traffic participant in an area within a preset distance from the vehicle, in response to determining that no input operation information of the user is received within a preset time interval.

In the present embodiment, the executing body may determine whether there is the traffic participant in the area within the preset distance from the vehicle, in response to determining that no input operation information of the user is received within the preset time interval. The preset time interval and the preset distance may be provided as required. Alternatively, there may be not merely one, time interval and one preset distance. For example, two different time intervals may be provided for use as a first time interval and a second time interval. For another example, different preset distances may be provided for different positions of the vehicle. In practice, a preset distance to the vehicle at the front of the vehicle may be set with a greater value; a preset distance to the vehicle at the rear of the vehicle may be set with a value slightly smaller than the above distance; and a distance to the vehicle at the left side or right side of the vehicle may be set with a more smaller value.

In the present embodiment, the executing body may perform obstacle detection using a LiDAR (Light Detection And Ranging) mounted on the vehicle, and then determine whether there is the traffic participant in the area within the preset distance from the vehicle. The traffic participant may include, but is not limited to, interactable objects, such as pedestrians, and vehicles.

In some alternative implementations of the present embodiment, the executing body may further determine whether there is the traffic participant in the area within the preset distance from the vehicle using various pedestrian detection technologies. As an example, whether there is a picture of the traffic participant in an image can be determined by recognition using a classifier, such as a Support Vector Machine (SVM), an adaptive boosting classifier (Adaboost), or a Deep Neural Network (DNN), with an image sequence acquired by a camera mounted on the vehicle as an input; then, a distance between the detected traffic participant and the vehicle is determined based on data acquired by the lidar mounted on the vehicle; and then, whether the traffic participant is located in the area within the preset distance from the vehicle is determined based on comparison between the above distance between the detected traffic participant and the vehicle and the preset distance.

In some alternative implementations of the present embodiment, in response to determining that no input operation information of the user is received within a preset first time interval, the executing body may send a prompt message, for example, "a waiting operation;" and for another example, "operation prompt: Please input a verification code on a screen." The prompt message may be a voice broadcasted via a speaker, or a text or image displayed on a display screen. Then, the executing body may determine whether there is the traffic participant in the area within the preset distance from the vehicle by the above approaches, in response to determining no input operation information of the user is received within a preset second time interval. A numerical value of the second time interval is generally greater than a numerical value of the first time interval.

Step 406: sending control information for controlling the vehicle to start to move, in response to determining there not being the traffic participant in the area within the preset distance from the vehicle.

In present embodiment, the control information for controlling the vehicle to start to move is sent, in response to determining there not being the traffic participant in the area within the preset distance from the vehicle. The control information for controlling the vehicle to start to move may be in various forms, such as letters, and numerals.

In the present embodiment, the executing body may send the control information for controlling the vehicle to start to move to a control system of the vehicle, and then the control system of the vehicle sends a control instruction for controlling the vehicle to start to move to an apparatus configured to drive the vehicle to move. Alternatively, the executing body may directly send the control information for controlling the vehicle to start to move to the apparatus configured to drive the vehicle to move.

In some alternative implementations of the present embodiment, the executing body may further send the control information for controlling the vehicle to start to move through the following steps.

Step I: acquiring state information of the vehicle-mounted device.

In these implementations, the executing body may acquire state information of the vehicle-mounted device from the vehicle-mounted device. The state information is used for characterizing whether there is a failure in the vehicle-mounted device. The state information may be in various forms, such as letters, and numerals. As an example, "0" may be used as the state information characterizing there not being the failure in the vehicle-mounted device; and "1" may be used as the information characterizing there being the failure in the vehicle-mounted device. It should be noted that the vehicle-mounted device and the executing body may be communicatively connected via an in-vehicle Ethernet. Alternatively, in order to ensure the connection not being interrupted, a heartbeat mechanism may further be used.

Step II: determining whether there is a failure in the vehicle-mounted device based on the state information.

The executing body may determine whether there is the failure in the vehicle-mounted device based on the state information. For example, in the above example, if the state information acquired by the executing body is "0," then there not being the failure in the vehicle-mounted device may be determined; and if the state information acquired by the executing body is "1," then there being the failure in the vehicle-mounted device may be determined.

Step III: sending the control information for controlling the vehicle to start to move, in response to determining there not being the failure in the vehicle-mounted device.

The executing body may send the control information for controlling the vehicle to start to move, in response to determining there not being the failure in the vehicle-mounted device. Alternatively, the executing body may acquire information characterizing whether the vehicle-mounted device is in a usage state from a target vehicle-mounted device. Then, the executing body may send the control information for moving the vehicle, in response to determining the acquired information being the information characterizing the vehicle-mounted device not being in the usage state.

In some alternative implementations of the present embodiment, the executing body may further send a mobile prompt message characterizing a prompt for evasion, in response to determining there being the traffic participant in the area within the preset distance from the vehicle. It can be understood that the above area within the preset distance from the vehicle is an area close to vehicle, and the traffic participant within the area may affect traveling of the vehicle. The executing body can determine whether there is the traffic participant in the area within the preset distance from the vehicle using the above obstacle detection method. In response to determining there being the traffic participant in the area within the preset distance from the vehicle, the mobile prompt message may be sent. The mobile prompt message may take various forms. As an example, the mobile prompt message may be "The vehicle is starting. Please avoid the vehicle."

In some alternative implementations of the present embodiment, the executing body may further send an interactive prompt message for guiding the traffic participant to perform an interactive operation, in response to determining the vehicle being in a traveling state. In practice, the executing body may determine whether the vehicle is in the traveling state based on information characterizing the traveling state of the vehicle. The above information characterizing the traveling state of the vehicle may be in various forms. For example, "00" may be used to denote a parking state; "01" may be used to denote a forward traveling state of the vehicle; "10" may be used to denote a backward traveling state of the vehicle; and "11" may be used to denote a turning and traveling state of the vehicle. The interactive prompt message may take various forms. As an example, the above interactive prompt message may be "please stop a vehicle by waving," or "for self-service shopping, please come closer."

In some alternative implementations of the present embodiment, the executing body may further send a safety prompt message, in response to determining the vehicle being in a turning and traveling state. In practice, the executing body can determine whether the vehicle is in the turning and traveling state based on the information characterizing the traveling state of the vehicle. The safety prompt message may take various forms. As an example, the above safety prompt message may be "Attention please! The vehicle is approaching," or "the vehicle is turning. Please be careful."

Alternatively, in practice, the executing body may send the above mobile prompt message, interactive prompt message, and safety prompt message to a voice synthesis device mounted on the vehicle, and then play the above mobile prompt message, interactive prompt message, and safety prompt message by the speaker. Alternatively, the executing body may send the above mobile prompt message, interactive prompt message, and safety prompt message to the display screen mounted on the vehicle, to interact with the traffic participant.

As can be seen from FIG. 4, compared the corresponding embodiment of FIG. 2, the process 400 of the method for controlling interaction between a vehicle and a vehicle-mounted device in the present embodiment reflects the determining whether there is a traffic participant in an area within a preset distance from the vehicle, in response to determining that no input operation information of a user is received within a preset time interval; and sending control information for controlling the vehicle to start to move, in response to determining there not being the traffic participant in the area within the preset distance from the vehicle. Thus, the scheme described in the present embodiment can control the vehicle to start to move from a parking state in the case of determining that no input operation information of the user is received, and determining there not being an obstacle around the vehicle, thus realizing controlling startup of the vehicle.

Figure 5:
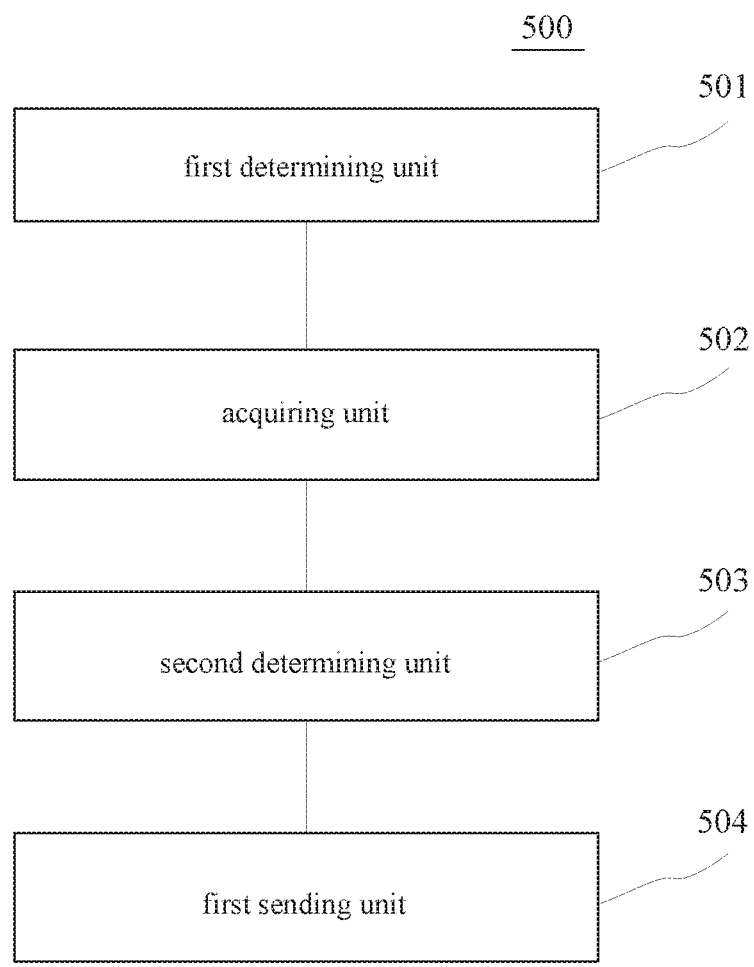
FIG. 5 is a schematic structural diagram of an embodiment of an apparatus for controlling interaction between a vehicle and a vehicle-mounted device according to the present disclosure.

Further referring to FIG. 5, as an implementation of the method shown in the above figures, the present disclosure provides an embodiment of an apparatus for controlling interaction between a vehicle and a vehicle-mounted device. The embodiment of the apparatus corresponds to the embodiment of the method shown in FIG. 2, and the apparatus may be specifically applied to various electronic devices.

As shown in FIG. 5, the apparatus 500 for controlling interaction between a vehicle and a vehicle-mounted device provided by the present embodiment includes: a first determining unit 501, an acquiring unit 502, second determining unit 503, and a first sending unit 504. The first determining unit 501 is configured to determine whether the vehicle is in a parking state; the acquiring unit 502 is configured to acquire input operation information of a user in response to determining the vehicle being in the parking state; the second determining unit 503 is configured to determine whether there is an operation matching the input operation information based on the input operation information; and the first sending unit 504 is configured to send control information for executing the operation to the vehicle-mounted device, in response to determining there being the operation matching the input operation information.

In the present embodiment, the specific processing of the first determining unit 501, the acquiring unit 502, the second determining unit 503, and the first sending unit 504 of the apparatus 500 for controlling interaction between a vehicle and a vehicle-mounted device and the technical effects thereof may be referred to the related description in step 201, step 202, step 203, and step 204 in the corresponding embodiment of FIG. 2, respectively. The description will not be repeated here.

In some alternative implementations of the present embodiment, the input operation information may include an audio; and the second determining unit 503 may include: a voice recognizing module (not shown in the figure), and a first determining module (not shown in the figure). The voice recognizing module may be configured to perform voice recognition on the audio, to generate a voice recognition result. The first determining module may be configured to determine whether there is the operation matching the input operation information based on the voice recognition result.

In some alternative implementations of the present embodiment, the apparatus 500 for controlling interaction between a vehicle and a vehicle-mounted device may further include a second sending unit (not shown in the figure). The second sending unit may be configured to send a prompt message in response to determining there not being the operation matching the input operation information.

In some alternative implementations of the present embodiment, the apparatus 500 for controlling interaction between a vehicle and a vehicle-mounted device may further include a third determining unit (not shown in the figure), and a third sending unit (not shown in the figure). The third determining unit may be configured to determine whether there is a traffic participant in an area within a preset distance from the vehicle, in response to determining that no input operation information of the user received within a preset time interval. The third sending unit may be configured to send control information for controlling the vehicle to start to move, in response to determining there not being the traffic participant in the area within the preset distance from the vehicle.

In some alternative implementations of the present embodiment, the third sending unit may include: an acquiring module (not shown in the figure), a second determining module (not shown in the figure), and a sending module (not shown in the figure). The acquiring module may be configured to acquire state information of the vehicle-mounted device. The second determining module may be configured to determine whether there is a failure in the vehicle-mounted device based on the state information. The sending module may be configured to send the control information for controlling the vehicle to start to move, in response to determining there not being the failure in the vehicle-mounted device.

In some alternative implementations of the present embodiment, the apparatus 500 for controlling interaction between a vehicle and a vehicle-mounted device may further include a fourth sending unit (not shown in the figure). The fourth sending unit may be configured to send an interactive prompt message for guiding the traffic participant to perform an interactive operation, in response to determining the vehicle being in a traveling state.

In some alternative implementations of the present embodiment, the apparatus 500 for controlling interaction between a vehicle and a vehicle-mounted device may further include a fifth sending unit (not shown in the figure). The fifth sending unit may be configured to send a safety prompt message, in response to determining the vehicle being in a turning and traveling state.

The apparatus provided by the above embodiments of the present disclosure first determines whether the vehicle is in a parking state by the first determining unit 501; then acquires input operation information of a user by the acquiring unit 502, in response to determining the vehicle being in the parking state; then determines whether there is an operation matching the input, operation information based on the input operation information by the second determining unit 503; and finally sends control information for executing the operation to the vehicle-mounted device by the first sending unit 504, in response to determining there being the operation matching the input operation information, thereby achieving controlling the vehicle-mounted device based on the vehicle state and the user input.

Figure 6:
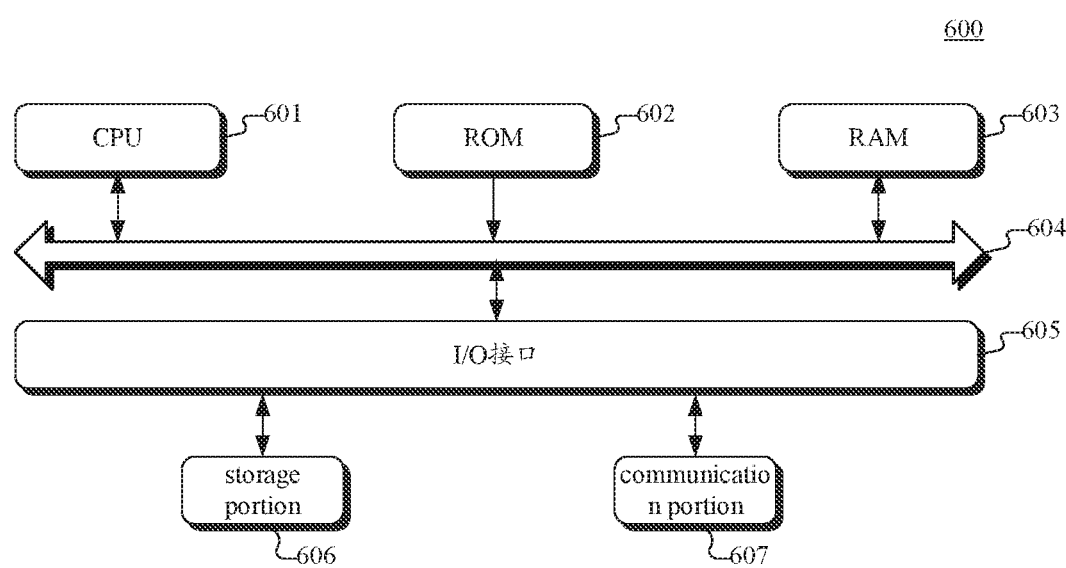
FIG. 6 is a schematic structural diagram of a computer system adapted to implement an electronic device of embodiments of the present disclosure.

Referring to FIG. 6 below, a schematic structural diagram of a computer system 600 adapted to implement an electronic device of embodiments of the present disclosure is shown. The electronic device shown in FIG. 6 is merely an example, and should not limit the functions and scope of use of the embodiments of the present disclosure.

As shown in FIG. 6, the computer system 600 includes a central processing unit (CPU) 601, which may execute various appropriate actions and processes in accordance with a program stored in a read only memory (ROM) 602 or a program loaded into a random access memory (RAM) 603 from a storage portion 608. The RAM 603 further stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: a storage portion 606 including a hard disk, or the like; and a communication portion 607 including a network interface card, such as a LAN card, and a modem. The communication portion 607 performs communication processes via a network, such as the Internet.

It should be noted that, the electronic device may be stand-alone, or be installed in a vehicle. When the electronic device is installed in the vehicle, the above functions may be further integrated into a processor of a driving control system of the vehicle.

In particular, according to the embodiments of the present disclosure, the process described above with reference to the flow chart may be implemented in a computer software program. For example, an embodiment of the present disclosure includes a computer program product, which comprises a computer program that is tangibly embedded in a computer readable medium. The computer program includes program codes for executing the method as illustrated in the flow chart. In such an embodiment, the computer program may be downloaded and installed from a network via the communication portion 607. The computer program, when executed by the central processing unit (CPU) 601, implements the above functions as defined by the method of the present disclosure.

It should be noted that the computer readable medium of the present disclosure may be a computer readable signal medium or a computer readable storage medium or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory device, or any suitable combination of the above. In the present disclosure, the computer readable storage medium may be any tangible medium containing or storing programs, which may be used by, or used in combination with, a command execution system, apparatus or element. In the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through the Internet using an Internet service provider).

The flow charts and block diagrams in the accompanying drawings illustrate architectures, functions and operations that may be implemented according to the methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logical functions. It should also be noted that, in some alternative implementations, the functions denoted by the blocks may occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in the embodiments of the present disclosure may be implemented by means of software or hardware. The described units may also be provided in the processor, for example, described as: a processor including a first determining unit, an acquiring unit, a second determining unit, and a first sending unit. The names of the units do not constitute a limitation to such units themselves in some cases. For example, the first determining unit may be further described as "a unit configured to determine whether the vehicle is in a parking state."

In another aspect, the present disclosure further provides a computer readable medium. The computer readable medium may be included in the electronic device described in the above embodiments, or a stand-alone computer readable medium without being assembled into the electronic device. The computer readable medium stores one or more programs. The one or more programs, when executed by the electronic device, cause the electronic device to: determine whether the vehicle is in a parking state; acquire input operation information of a user, in response to determining the vehicle being in the parking state; determine whether there is an operation matching the input operation information based on the input operation information; and send control information for executing the operation to the vehicle-mounted device, in response to determining there being the operation matching the input operation information.

The above description only provides explanation of the preferred embodiments and the employed technical principles of the present disclosure. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the concept of the disclosure, for example, technical solutions formed by the above-described features being interchanged with, but not limited to, technical features with similar functions disclosed in the present disclosure.

What is claimed is:

1. A method for controlling interaction between a vehicle and a vehicle-mounted device, the method comprising:
    determining whether the vehicle is in a parking state;
    acquiring input operation information of a user, in response to determining the vehicle being in the parking state;
    determining whether there is a match of an operation to the input operation information based on the input operation information;
    sending control information for executing the operation to the vehicle-mounted device, in response to determining there being the match of the operation to the input operation information;
    determining that a touch screen of the vehicle does not receive any input for a preset time interval;
    performing a detection for a traffic participant in an area within a preset distance from the vehicle, in response to determining that the touch screen does not receive any input for the preset time interval; and
    sending control information for controlling the vehicle to start to move, in response to determining that no traffic participant is detected in the area within the preset distance from the vehicle.

2. The method according to claim 1, wherein the input operation information comprises an audio; and
    the determining whether there is the match of the operation to the input operation information comprises:
    performing a voice recognition on the audio, to generate a voice recognition result; and
    determining whether there is the match of the operation to the input operation information based on the voice recognition result.

3. The method according to claim 1, wherein the method further comprises:
    sending a prompt message in response to determining there not being the match of the operation to the input operation information.

4. The method according to claim 1, wherein the sending control information for controlling the vehicle to start to move comprises:
    acquiring state information of the vehicle-mounted device;
    determining whether there is a failure in the vehicle-mounted device based on the state information; and
    sending the control information for controlling the vehicle to start to move, in response to determining there not being the failure in the vehicle-mounted device.

5. The method according to claim 1, wherein the method further comprises:
    sending an interactive prompt message for guiding the traffic participant to perform an interactive operation, in response to determining the vehicle being in a traveling state.

6. The method according to claim 1, wherein the method further comprises:
    sending a safety prompt message, in response to determining the vehicle being in a turning and traveling state.

7. The method according to claim 1, wherein the vehicle-mounted device is a vending machine.

8. The method according to claim 7, wherein the input operation information comprises a selected purchasing item and a paid amount inputted by the user on the touch screen.

9. An apparatus for controlling interaction between a vehicle and a vehicle-mounted device, the apparatus comprising:
- at least one processor; and
- a memory storing instructions, wherein the instructions when executed by the at least one processor, cause the at least one processor to perform operations, the operations comprising:
- determining whether the vehicle is in a parking state;
- acquiring input operation information of a user in response to determining the vehicle being in the parking state;
- determining whether there is a match of an operation to the input operation information based on the input operation information;
- sending control information for executing the operation to the vehicle-mounted device, in response to determining there being the match of the operation to the input operation information;
- determining that a touch screen of the vehicle does not receive any input for a preset time interval;
- performing a detection for a traffic participant in an area within a preset distance from the vehicle, in response to determining that the touch screen does not receive any input for the preset time interval; and
- sending control information for controlling the vehicle to start to move, in response to determining no traffic participant is detected in the area within the preset distance from the vehicle.

10. The apparatus according to claim 9, wherein the input operation information comprises an audio; and
- the determining whether there is the match of the operation to the input operation information comprises:
- performing a voice recognition on the audio, to generate a voice recognition result; and
- determining whether there is the match of the operation to the input operation information based on the voice recognition result.

11. The apparatus according to claim 9, wherein the operations further comprise:
- sending a prompt message in response to determining there not being the match of the operation to the input operation information.

12. The apparatus according to claim 9, wherein the sending control information for controlling the vehicle to start to move comprises:
- acquiring state information of the vehicle-mounted device;
- determining whether there is a failure in the vehicle-mounted device based on the state information; and
- sending the control information for controlling the vehicle to start to move, in response to determining there not being the failure in the vehicle-mounted device.

13. The apparatus according to claim 9, wherein the operations further comprise:
- sending an interactive prompt message for guiding the traffic participant to perform an interactive operation, in response to determining the vehicle being in a traveling state.

14. The apparatus according to claim 9, wherein the operations further comprise:
- sending a safety prompt message, in response to determining the vehicle being in a turning and traveling state.

15. A non-transitory computer readable medium, storing a computer program thereon, wherein the program, when executed by a processor, causes the processor to perform operations, the operations comprising:
- determining whether a vehicle is in a parking state;
- acquiring input operation information of a user, in response to determining the vehicle being in the parking state;
- determining whether there is a match of an operation to the input operation information based on the input operation information;
- sending control information for executing the operation to a vehicle-mounted device, in response to determining there being the match of the operation to the input operation information;
- determining that a touch screen of the vehicle does not receive any input for a preset time interval;
- performing a detection for a traffic participant in an area within a preset distance from the vehicle, in response to determining that the touch screen does not receive any input for the preset time interval; and
- sending control information for controlling the vehicle to start to move, in response to determining no traffic participant is detected in the area within the preset distance from the vehicle.

* * * * *